US006469719B1

(12) United States Patent
Kino et al.

(10) Patent No.: US 6,469,719 B1
(45) Date of Patent: Oct. 22, 2002

(54) GRAPHICAL USER INTERFACE APPARATUS WITH IMPROVED LAYOUT OF MENU ITEMS

(75) Inventors: Hisayuki Kino, Nara-ken (JP); Norio Sanada, Kobe (JP); Kiyokazu Yamanaka, Ashiya (JP); Chihiro Kawahara, Kadoma (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/419,152

(22) Filed: Oct. 15, 1999

(30) Foreign Application Priority Data

Oct. 20, 1998 (JP) ............................................ 10-297823

(51) Int. Cl.[7] .................................................. G06F 3/14
(52) U.S. Cl. ........................ 345/810; 345/815; 345/825
(58) Field of Search ................................. 345/700, 744, 345/764, 788, 798–801, 810, 815, 825, 826, 835

(56) References Cited

U.S. PATENT DOCUMENTS

| | | | |
|---|---|---|---|
| 5,041,967 A | * 8/1991 | Ephrath et al. .............. 345/825 |
| 5,060,170 A | * 10/1991 | Bourgeois et al. ........... 345/788 |
| 5,220,500 A | 6/1993 | Baird et al. .................... 705/36 |
| 5,280,573 A | 1/1994 | Kuga et al. ................... 345/708 |
| 5,297,249 A | 3/1994 | Bernstein et al. ............ 345/854 |
| 5,367,619 A | 11/1994 | Dipaolo et al. .............. 707/506 |
| 5,392,387 A | 2/1995 | Fitzpatrick et al. .......... 345/776 |
| 5,404,393 A | 4/1995 | Remillard ................. 379/93.25 |
| 5,412,720 A | 5/1995 | Hoarty ........................ 380/211 |
| 5,432,902 A | 7/1995 | Matsumoto .................. 345/812 |
| 5,442,795 A | 8/1995 | Levine et al. ................ 345/775 |
| 5,513,308 A | 4/1996 | Mori ........................... 345/707 |
| 5,530,869 A | 6/1996 | Salle ............................. 717/1 |
| 5,541,662 A | 7/1996 | Adams et al. ............... 348/460 |
| 5,548,692 A | * 8/1996 | Cok ............................ 345/667 |
| 5,550,746 A | 8/1996 | Jacobs ......................... 700/231 |
| 5,555,496 A | 9/1996 | Tackbary et al. .............. 705/27 |
| 5,570,126 A | 10/1996 | Blahut et al. .................. 725/93 |
| 5,574,494 A | 11/1996 | Maries .......................... 725/37 |
| 5,583,560 A | 12/1996 | Florin et al. ................... 725/40 |
| 5,585,838 A | 12/1996 | Lawler et al. ................. 725/54 |
| 5,623,613 A | 4/1997 | Rowe et al. ................. 345/841 |
| 5,628,004 A | 5/1997 | Gromley et al. .......... 707/104.1 |
| 5,635,979 A | 6/1997 | Kostreski et al. ........... 725/132 |
| 5,663,757 A | 9/1997 | Morales .......................... 725/5 |
| 5,664,133 A | 9/1997 | Malamud et al. ........... 345/816 |
| 5,721,897 A | 2/1998 | Rubinstein ..................... 707/2 |
| 5,734,853 A | 3/1998 | Hendricks et al. ........... 345/716 |
| 5,760,776 A | * 6/1998 | McGurrin et al. ........... 345/841 |
| 5,774,109 A | 6/1998 | Winksy et al. .............. 345/685 |
| 5,774,361 A | 6/1998 | Colarelli, III et al. ........ 701/29 |
| 5,784,583 A | 7/1998 | Redpath ...................... 345/841 |
| 5,809,471 A | 9/1998 | Brodsky ...................... 704/275 |
| 5,838,317 A | * 11/1998 | Bolnick et al. .............. 345/764 |
| 5,844,620 A | 12/1998 | Coleman et al. ............. 348/461 |
| 5,880,768 A | 3/1999 | Lemmons et al. ............. 725/41 |
| 5,956,035 A | * 9/1999 | Sciammarella et al. ..... 345/815 |

FOREIGN PATENT DOCUMENTS

JP        52477        1/1993

* cited by examiner

*Primary Examiner*—Crescelle N. Dela Torre
(74) *Attorney, Agent, or Firm*—Price and Gess

(57) ABSTRACT

A layout unit refers to a plurality of menu items stored in a menu item information storage unit by a menu item information obtaining unit. The following processes are performed as necessary to display a large number of menu items in a predetermined part of a GUI screen. A character size reducing unit reduces the size of characters used to display menu items. A margin reducing unit determines the layout of menu items so as to reduce the margins in menu items. An abbreviating unit replaces certain character strings in menu items with shorter character strings. In this way, the layout unit determines the layout of menu items. A menu control unit then has the menu items displayed in accordance with the layout determined by the layout unit.

8 Claims, 14 Drawing Sheets

| 10 | |
|---|---|
| 8 | Pop/Rock |
| 9 | Classical |
| 4 | Folk |
| 6 | Reggae |
| 11 | Soundtracks |
| 5 | Blues |
| 4 | Jazz |
| 19 | Country and Western |
| 11 | World Music |
| 7 | New Age |

| REPLACEABLE CHARACTER STRING | ABBREVIATED CHARACTER STRING |
|---|---|
| Music | NONE |
| Information | NONE |
| Country and Western | C&W |
| Alternative | Indie |
| Electronica | Techno |
| Data | NONE |

Fig. 10

| ALL EQUAL |
|---|
| 24-POINT |
| (100, 40, 250, 100) |
| SINGLE MENU ITEM INFORMATION #1 |
|     Pop/Rock |
|     75 |
|     (100, 40) |
| SINGLE MENU ITEM INFORMATION #2 |
|     Classical |
|     75 |
|     (100, 52) |
| ⋮ |
| SINGLE MENU ITEM INFORMATION #8 |
|     Country and Western |
|     75 |
|     (175, 64) |
| SINGLE MENU ITEM INFORMATION #9 |
|     World Music |
|     75 |
|     (175, 76) |

Fig. 12

| EQUAL WITHIN COLUMNS | | |
|---|---|---|
| 20-POINT | | |
| (100, 40, 250, 100) | | |
| SINGLE MENU ITEM INFORMATION #1 | | |
| | Pop/Rock | |
| | 50 | |
| | (100, 40) | |
| SINGLE MENU ITEM INFORMATION #2 | | |
| | Classical | |
| | 50 | |
| | (100, 50) | |
| ⋮ | | |
| SINGLE MENU ITEM INFORMATION #8 | | |
| | Country and Western | |
| | 75 | |
| | (150, 50) | |
| SINGLE MENU ITEM INFORMATION #9 | | |
| | World Music | |
| | 75 | |
| | (150, 60) | |

Fig. 14

| EQUAL WITHIN COLUMNS |
| --- |
| 20-POINT |
| (100, 40, 250, 100) |

| SINGLE MENU ITEM INFORMATION #1 | |
| --- | --- |
| | Pop/Rock |
| | 50 |
| | (100, 40) |

| SINGLE MENU ITEM INFORMATION #2 | |
| --- | --- |
| | Classical |
| | 50 |
| | (100, 50) |

⋮

| SINGLE MENU ITEM INFORMATION #8 | |
| --- | --- |
| | C&W |
| | 40 |
| | (150, 50) |

| SINGLE MENU ITEM INFORMATION #9 | |
| --- | --- |
| | World |
| | 40 |
| | (150, 60) |

⋮

| SINGLE MENU ITEM INFORMATION #14 | |
| --- | --- |
| | Recommended |
| | 55 |
| | (190, 50) |

GRAPHICAL USER INTERFACE APPARATUS WITH IMPROVED LAYOUT OF MENU ITEMS

This application is based on an application No. H10-297823 filed in Japan, the content of which is hereby incorporated by reference.

BACKGROUND OF THE INVENTION

1. Field of the Invention

The present invention relates to a graphical user interface (hereinafter, "GUI") and in particular to a technique for arranging items that can be selected by the user on a display screen.

2. Description of Prior Art

In recent years, there has been a great increase in the number of digital communication apparatuses and household appliances that use a GUI screen as a user interface. This increase has generated a great demand for techniques that can simplify and speed up the generation of GUI screens.

GUI screens are composed of GUI elements that are text items or images, such as buttons or boxes, having special characteristics. These GUI elements include menu items that are subject to selection operations made by the user.

A GUI screen is usually used to present a variety of information to the user and to accept a variety of user requests, with the content of the GUI screen changing in various ways depending on the input made by the user or other factors.

Conventionally, GUI screens are changed by switching between a plurality of GUI screens that are defined in advance, so that the design and development of a changing GUI screen require the advance definition of a plurality of GUI screens. Each GUI screen is defined by specifying the shape, arrangement, and operation of the screen and the shapes, arrangements, and operations of every GUI element that composes the GUI screen in advance. GUI screens thus defined are arranged into a memory, or the like, in the target apparatus as sets of information, with the target apparatus displaying each GUI screen as necessary on a display screen according to a program provided in the apparatus.

Japanese Laid-Open Patent Application No. H05-2477 teaches a technique for simplifying the design and development of GUI screens. In this technique, the program developer selects the GUI elements that compose the GUI screen from a list using a pointing device, such as a mouse, and arranges the selected GUI elements on the GUI screen. The program developer can change attributes such as the color and size of each GUI element, and can define the processing to be executed when the user operates a GUI element. Accordingly, this technique enables the program developer to construct and adjust GUI screens.

One requirement for effective GUI screens is that it should be easy for users to select their desired menu items. To ensure that users can select a desired menu item with a minimal number of operations even when a large number of menu items are available, GUI screens need to be designed and developed so that the greatest possible number of menu items are simultaneously presented to the user.

However, the number of menu items in a GUI screen can fluctuate. To improve the clarity and operability of GUI screens for different number of menu items when designing GUI screens according to the above conventional technique, a plurality of GUI screens with different arrangements of menu items need to be designed and the selection of GUI screen needs to change in accordance with the number of menu items to be displayed. This means that much time is required to define the GUI screens.

One conventional method for displaying a large number of selectable menu items to the user adds a scroll bar or a display switching button to a GUI screen that is originally designed to display only a predetermined number of menu items. When the user operates the scroll bar or a display switching button, the display content switches to reveal menu items that were not originally displayed. However, the above method has a drawback in that the positions for displaying menu items and the number of menu items that can be displayed at any given time is fixed when the GUI screen is defined. This means that when the number of menu items only slightly exceeds the maximum number that can be displayed at any given time, the user will still have to go to the inconvenience of operating the scroll bar or display switching button in order to select the menu items that are not originally displayed on the GUI screen.

SUMMARY OF THE INVENTION

The present invention was conceived in view of the problem described above, and has a primary object of providing a GUI apparatus that can favorably display a plurality of menu items in a GUI screen with a suitable layout for the sizes and total number of the menu items, without requiring the definition of a plurality of GUI screens with different layouts of menu items. In other words, the present invention aims to provide a GUI apparatus that can display a large number of menu items in part or all of a GUI screen.

The primary object of the present invention can be achieved by a GUI (Graphical User Interface) apparatus that displays a plurality of menu items in a predetermined area of a screen, including: a menu item storing unit for storing a plurality of menu items; a layout determining unit for adjusting, for each menu item, a display position of the menu item and a display form that affects a display size of the menu item, so as to determine a layout that enables a large number of menu items to be displayed in a readable fashion in the predetermined area; and a display unit for displaying the plurality of menu items in accordance with the display forms and display positions determined by the layout determining unit.

With the stated construction, the display form and display position of each menu item stored in the menu item storing unit can be adjusted, so that more menu items can be displayed on the GUI screen. This allows the user to view more selectable menu items on the screen at a time, and makes it easy for the user to select his/her desired menu item. The GUI apparatus of the present invention can dynamically arrange the menu items even if the display positions of menu items are not determined in advance, and so can reduce the time taken to design and develop GUI screens.

Here, the layout determining unit may include: a display form determining unit for determining, when it is not possible to arrange every menu item into the predetermined area using predetermined display forms as the display forms for the menu items, the display forms of the menu items so as to reduce the display size of at least one of the menu items; and a display position determining unit for determining the display position of each menu item after the display forms of the menu items have been determined by the display form determining unit so that the menu items do not overlap one another.

By having the stated construction, the GUI apparatus of the present invention can reduce the display forms of menu items when it is not possible to display all of the menu items on the screen using predetermined display forms. By doing so, more menu items can be displayed on the screen. If relatively large display forms are used as the predetermined display forms, all menu items can be favorably displayed with respect to the sizes and the total number of menu items. Such a favorable display makes it easy for the user to select a menu item.

Note that when the menu items are character strings, reduction of the character size, reduction of the margins, and replacement/deletion of parts of the character strings can be performed to reduce the display form of a menu item. In general, it is important for GUI screens to display menu items large enough for the user to discern the meanings of the menu items. While the aim of simultaneously displaying a large number of menu items can conflict with the aim of displaying menu items clearly, reduction of the character size, reduction of the margins, and replacement/deletion of part of the character string reduce the display size of menu items without making them overly difficult to read, so that menu items can be favorably laid out on the screen.

The GUI apparatus may further include a menu item obtaining unit for obtaining the plurality of menu items from outside the GUI apparatus and storing the obtained plurality of menu items into the menu item storing unit.

With the stated construction, the menu items that are to be displayed on the GUI screen can be obtained by receiving them from outside the GUI apparatus. These menu items can then be displayed in a manner that facilitates selection operations by the user. This means that the GUI apparatus of the present invention is suited to cases where a variable number of menu items with different contents are received from outside.

The stated object can also be achieved by a GUI apparatus that displays a plurality of menu items composed of character strings in a predetermined area of a screen, the GUI apparatus including: a menu item storing unit for storing a plurality of menu items; a display form determining unit for determining, when it is not possible to arrange every menu item into the predetermined area with a predetermined character size as part of a display form of each menu item, a display form of each menu item by reducing a character size used in the display form of at least one menu item; a display position determining unit for determining, after the display forms of the menu items have been determined by the display form determining unit, a display position of each menu item so that the menu items do not overlap one another; and a display unit for displaying the plurality of menu items in accordance with the display forms determined by the display form determining unit and the display positions determined by the display position determining unit.

With the stated construction, menu items that are displayed using character strings can be displayed with a suitable character size for the number of menu items and their contents. The resulting display enables the user to recognize a large number of menu items at a glance, and thereby makes it easy for the user to select their desired menu item.

Here, the display form determining unit may reduce the character size with a predetermined size as a minimum value, and when it is still not possible to arrange every menu item into the predetermined area after reducing the character size, may determine the display form of each menu item by reducing a number of characters in a character string of at least one menu item.

The above construction ensures that the size of characters will not be reduced to an extent where the characters become difficult to read. This ensures that the user will still be able to instantly recognize the menu items available when making a selection operation, so that even when the number of menu items increases, the user will still be able to make selection operations easily.

The stated object can be achieved by a GUI apparatus that displays a plurality of menu items composed of character strings in a predetermined area of a screen, the GUI apparatus including: a menu item storing unit for storing a plurality of menu items; a replaceable character string information storage unit for storing at least one replaceable character string associated with a mark that represents the replaceable character string and has a smaller display size than the replaceable character string; a display form determining unit for determining, when it is not possible to arrange every menu item into the predetermined area with a predetermined character size as part of a display form for each menu item, a display form of each menu item by replacing at least one replaceable character string in a character string of at least one menu item with a mark associated with the replaceable character string in the replaceable character string information storage unit; a display position determining unit for determining, after the display forms of the menu items have been determined by the display form determining unit, the display position of each menu item so that the menu items do not overlap one another; and a display unit for displaying the plurality of menu items in accordance with the display forms determined by the display form determining unit and the display positions determined by the display position determining unit.

The above construction reduces the number of characters in character strings by replacing certain character strings in menu items with abbreviated character strings. This. means that the menu items can be displayed in a smaller area, and so allows more menu items to be simultaneously displayed. The user will therefore be able to view a larger number of menu items at a glance, which improves the ease with which the user can perform selection operations.

The stated object may also be achieved by a GUI apparatus that displays a plurality of menu items composed of character strings in a predetermined area of a screen, the GUI apparatus including: a menu item storing unit for storing a plurality of menu items; a deletable character string information storage unit for storing deletable character strings; a display form determining unit for determining, when it is not possible to arrange every menu item into the predetermined area with a predetermined character size as part of a display form for each menu item, a display form of each menu item by deleting at least one deletable character string given in the deletable character string information storing unit from a character string of at least one menu item; a display position determining unit for determining, after the display forms of the menu items have been determined by the display form determining unit, the display position of each menu item so that the menu items do not overlap one another; and a display unit for displaying the plurality of menu items in accordance with the display forms determined by the display form determining unit and the display positions determined by the display position determining unit.

With the stated construction, character strings that may be deleted from menu items without affecting the meanings of the menu items are stored in advance as deletable character strings. By deleting deletable character strings from menu items, the menu items can be displayed in a smaller space. This in turn allows more menu items to be simultaneously displayed to the user, and so makes selection operations easier.

The stated object can also be achieved by a GUI apparatus that displays a plurality of menu items composed of character strings in a two-dimensional grid in a predetermined area of a screen, the GUI apparatus including: a menu item storing unit for storing a plurality of menu items; a display form determining unit for determining, when it is not possible to arrange every menu item into the predetermined area using a display form where rectangular areas of an equal size are used to enclose a character string of each menu item, a display form of each menu item by setting a rectangular area of each menu item that is likely to be arranged into a same column in the two-dimensional grid at a smallest size that is still capable of accommodating any of the character strings of the menu items in the column; a display position determining unit for determining, after the display forms of the menu items have been determined by the display form determining unit, the display position of each menu item in the two-dimensional grid so that the menu items do not overlap one another; and a display unit for displaying the plurality of menu items in accordance with the display forms determined by the display form determining unit and the display positions determined by the display position determining unit.

The above construction displays the menu items laid out into rows and columns, which makes the menu items easier to see. As the width of each column only needs to be set at the width of the widest menu item in the column, a larger number of menu items can be simultaneously displayed, which makes selection operations easier for users.

As described above, the present invention provides a technology for favorably displaying a variable number of menu items of changeable contents on an operation display. This technology can be applied to all kinds of devices that have a user interface, and has the important technical effect of reducing the amount of time and effort required to design and develop user interfaces.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 10 shows the content of the layout information 100 that relates to the layout of ten menu items;

FIG. 12 shows an example content of the layout information 100 when twelve menu items are arranged;

FIG. 14 shows the content of the layout information 100 when thirteen or more menu items are to be arranged into the list box 220.

DESCRIPTION OF THE PREFERRED EMBODIMENT

The following describes a GUI apparatus that is an embodiment of the present invention, with reference to the enclosed drawings.

Apparatus Construction and Data Structure

Figure 1:
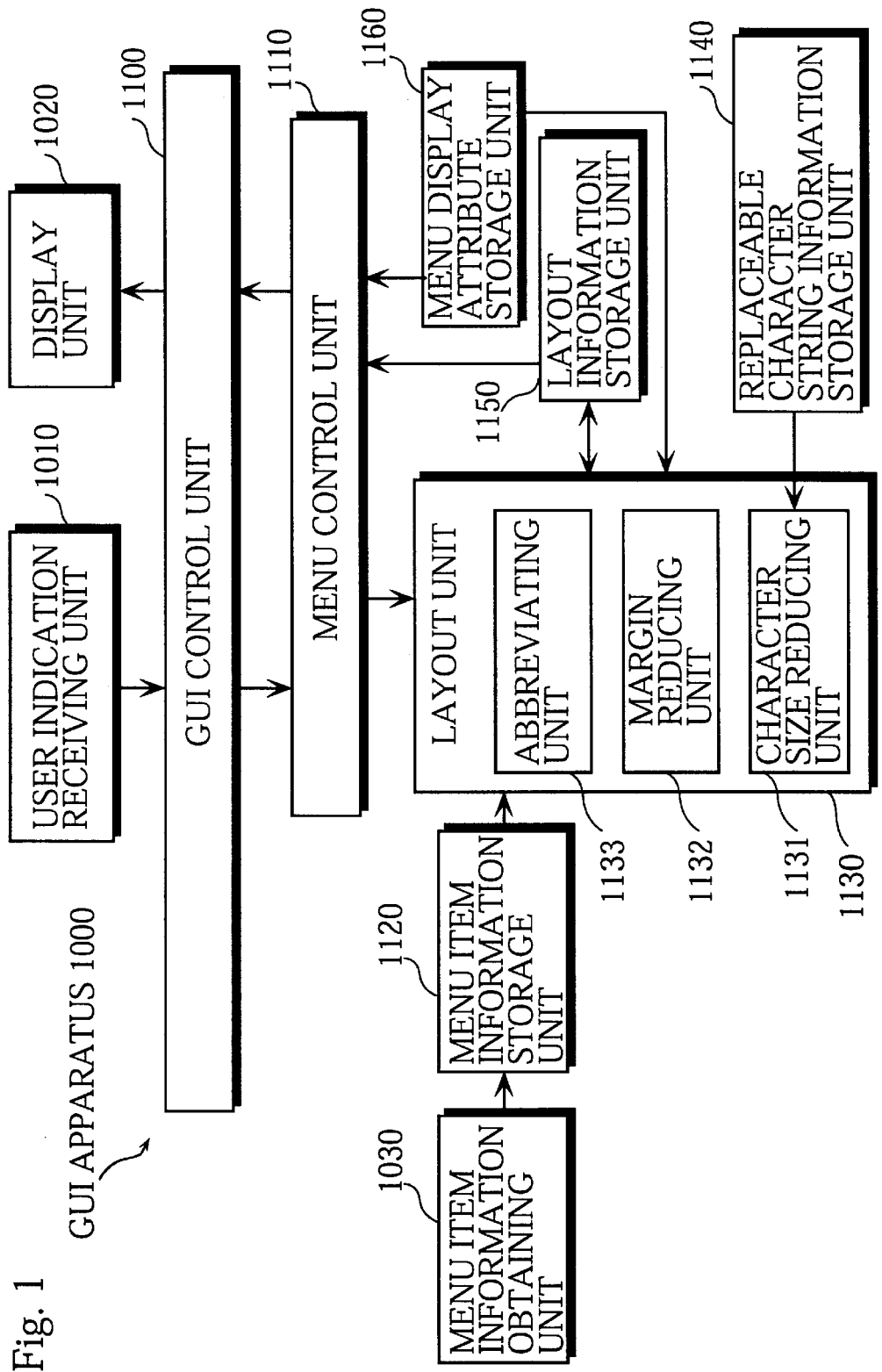
FIG. 1 is a functional block diagram of the GUI apparatus 1000 that is an embodiment of the present invention.

FIG. 1 is a functional block diagram of the GUI apparatus 1000 that is an embodiment of the present invention.

This GUI apparatus 1000 is in charge of the user interface of a digital broadcast reception apparatus. This digital broadcast reception apparatus receives a digital broadcast that is transmitted via satellite and displays the received programs on a monitor. In order to inform the user of the programs being broadcast, the GUI apparatus 1000 displays a GUI screen composed of menu items and the like on the monitor. The user views this GUI screen and changes the menu item in focus using a remote controller or the like to make selection operations.

As shown in FIG. 1, the GUI apparatus 1000 includes a user indication receiving unit 1010, a display unit 1020, a menu item information obtaining unit 1030, a GUI control unit 1100, a menu control unit 1110, a menu item information storage unit 1120, a layout unit 1130, a replaceable character string information storage unit 1140, a layout information storage unit 1150, and a menu display attribute storage unit 1160.

In terms of hardware, the GUI apparatus 1000 is realized by an information processing device that has a CPU (Central Processing Unit), a memory, and the like. The functions of the GUI apparatus 1000 are realized by the CPU executing a program stored in the memory.

The user indication receiving unit 1010 operates as follows. When the user has made an operation using a remote controller, the user indication receiving unit 1010 obtains information from a remote controller signal detecting device in the digital broadcast reception apparatus and informs the GUI control unit 1100 of the obtained information.

The display unit 1020 receives graphics information for the GUI screen from the GUI control unit 1100 and generates pixel data for displaying the GUI screen based on the received graphics information. The display unit 1020 then sends this pixel data to the monitor.

Figure 2:
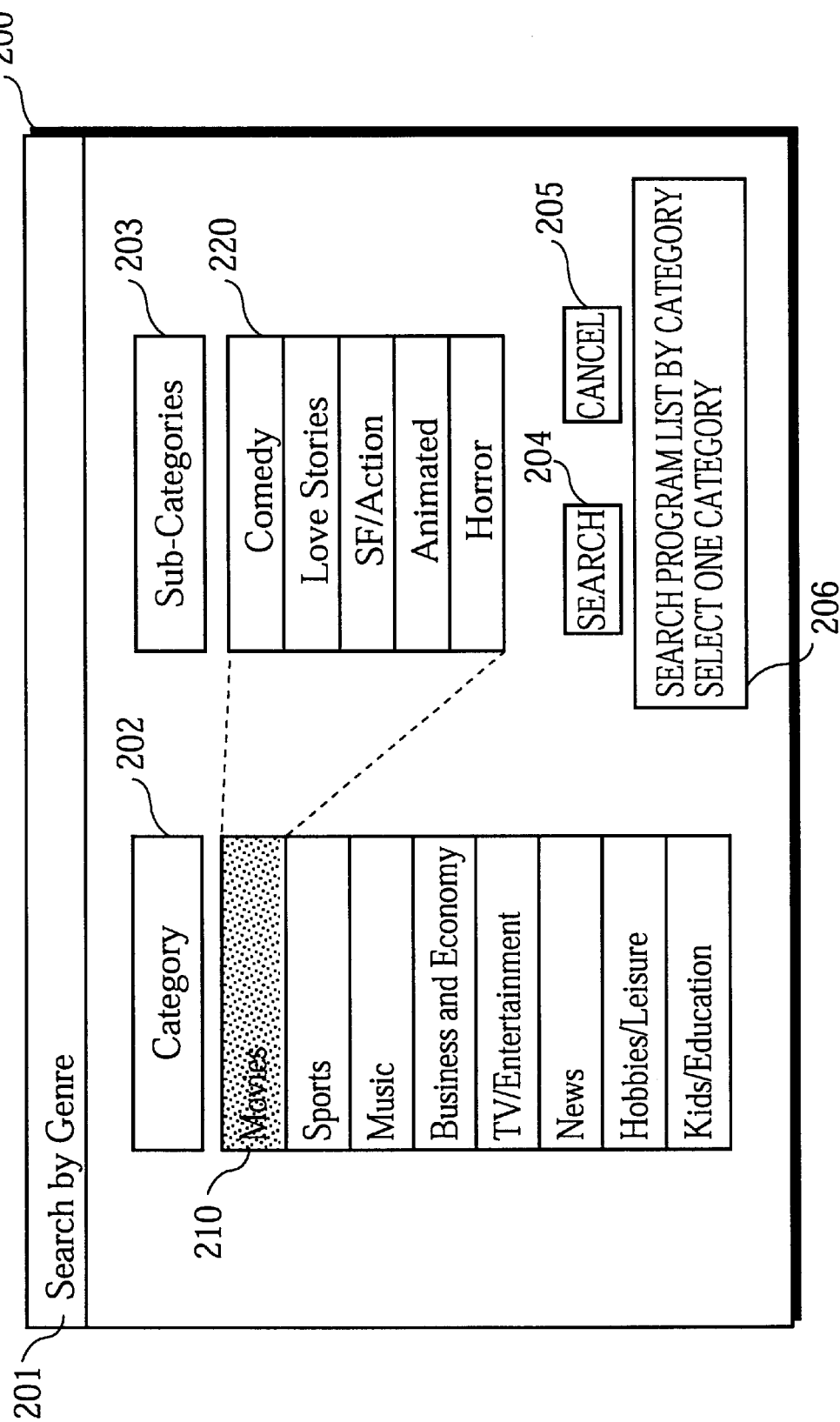
FIG. 2 shows an example of the GUI screen displayed by the GUI apparatus 1000.

FIG. 2 shows an example of the GUI screen displayed by the GUI apparatus 1000. The illustrated example is the GUI screen 200 that allows the user to search for programs according to genre and is used to indicate the program that should be received by the digital broadcast reception apparatus.

The GUI screen 200 is composed of the following GUI elements:

- a label 201 that displays the fixed heading "Search by Genre";
- a label 202 that displays the heading "Category";
- a label 203 that displays the heading "Sub-Categories";
- a list box 210 that displays a list of general categories;

a list box 220 that displays a list of narrow subcategories;

a command button 204 for executing a search;

a command button 205 for canceling the search operation; and a text box 206 for displaying a message.

Once the user has selected a "category" in the GUI screen 200 using the remote controller, a "subcategory" is further selected, so that the user narrows down the selection of program in stages. The description of the present embodiment focuses especially on the control performed for the list box 220.

The GUI control unit 1100 controls an entire GUI screen, such as that shown in FIG. 2. This GUI control unit 1100 has layout information for each GUI element in the GUI screen 200, as well as information for drawing the GUI elements, such as labels and command buttons, whose display content is fixed. The GUI control unit 1100 draws the various GUI elements, informs the operation control function unit of each GUI element in the GUI screen of user indications and outputs drawing instructions for the GUI elements whose display content can change. Note here that the operation control function unit corresponding to the list box 220 is the menu control unit 1110.

Based on remote controller operations made by the user, the GUI control unit 1100 moves the focus between menu items and performs other operations. Here, the term "focus" refers to a highlighted display in the GUI screen 200, with the menu item in focus being indicated to the user through display in inverse video, by the addition of a special mark, or other method.

The menu control unit 1110 controls the display of the list box 220 and operations performed in accordance with user operations made in response to the list box 220. When it is necessary to change the layout of the menu items in the list box 220, the menu control unit 1110 activates the layout unit 1130.

The layout unit 1130 refers to the menu item information stored in the menu item information storage unit 1120 and the menu display attribute information stored in the menu display attribute storage unit 1160 and determines the optimal layout of the menu items in the list box 220 by referring to and updating the content of the layout information storage unit 1150. To do so, the layout unit 1130 includes a character size reducing unit 1131, a margin reducing unit 1132, and an abbreviating unit 1133 as characteristic components.

The character size reducing unit 1131, the margin reducing unit 1132, and the abbreviating unit 1133 collectively function so as to display as many menu items as possible in a predetermined area. The character size reducing unit 1131 changes the size of display fonts to reduce the display size of the character strings that represent menu items. The margin reducing unit 1132 reduces the margins in the display rectangles of character strings to reduce the display width of menu items. The abbreviating unit 1133 changes the character strings used to display menu items to abbreviated character strings that are shorter that the character strings which are replaced. Note that in this specification, the term "abbreviating" includes the deletion of a character string or its replacement with a totally different character string.

The menu item information storage unit 1120 is composed of an area in a memory, and is used to store menu item information composed of character strings representing menu items that are used to display the list box 220.

Figures 3, 4:
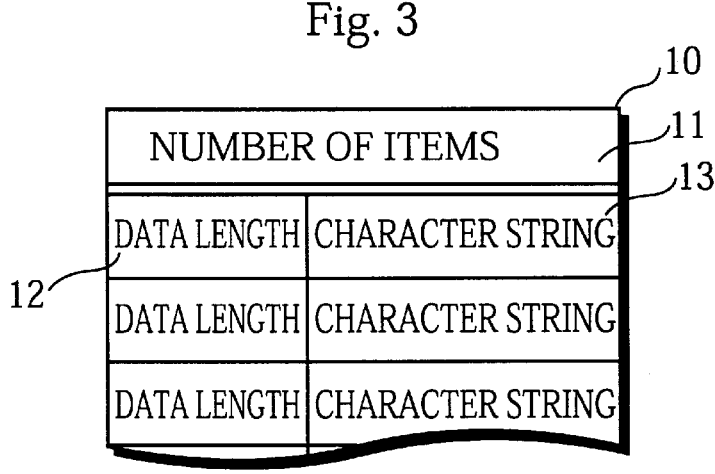
FIG. 3 shows the composition of the menu item information stored in the menu item information storage unit 1120.
FIG. 4 shows an example of the content of the menu item information.

FIG. 3 shows the composition of the menu item information stored in the menu item information storage unit 1120, while FIG. 4 shows an example of the content of the menu item information.

In the example in FIG. 4, the unit for calculating the data length of items in the menu item information is bytes, with the menu items such as "Pop/Rock" and "Classical" being expressed using single-byte characters.

The character strings in the menu item information may in fact be expressed by the character codes that should be given to the character string processing function provided by an operating system (OS) or the like. In general, a character string processing function is capable of drawing characters represented by character codes at a size shown by a separate indication, in addition to other character-related processes.

The menu item information obtaining unit 1030 obtains the menu item information from the part of the digital broadcast reception apparatus that receives the program list and similar information, and stores the menu item information in the menu item information storage unit 1120. This menu item information is information that is broadcast to the digital broadcast reception apparatus.

The layout information storage unit 1150 is composed of an area in a memory that stores the layout information.

Figure 5:
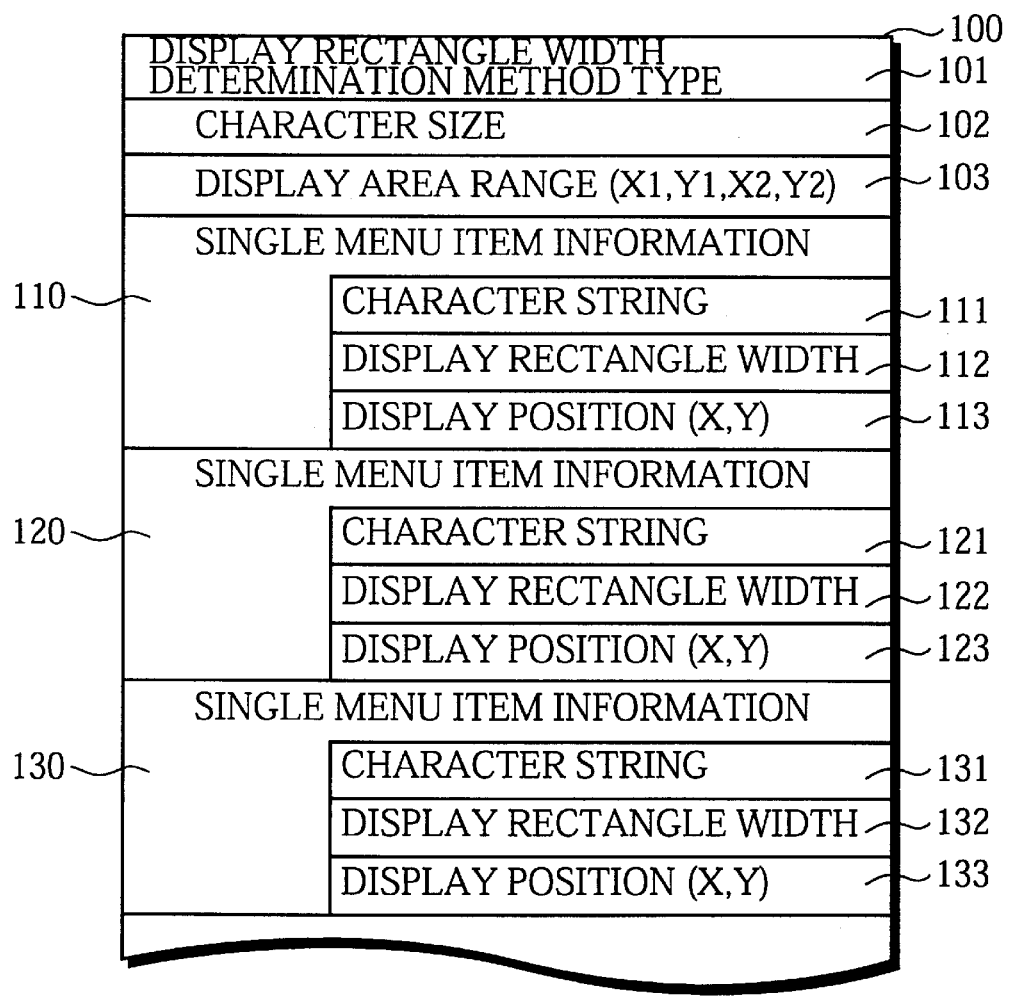
FIG. 5 shows the composition of the layout information stored in the layout information storage unit 1150.

FIG. 5 shows the composition of the layout information stored in the layout information storage unit 1150.

As shown in FIG. 5, the layout information 100 includes a display rectangle width determination method type 101, a character size 102, a display area range 103, and single menu item information such as 110, 120, and 130. While only three sets of single menu item information are shown in FIG. 5, the layout unit 1130 generates separate single menu item information for each menu item.

The display rectangle width determination method type 101 is information that shows whether the width of the display rectangles of menu items should be determined as "all equal" or "equal within columns". When the display rectangle width determination method type 101 is "all equal", the display rectangles of all menu items should have the same width, while when the display rectangle width determination method type 101 is "equal within columns", all menu items in the same column should have the same width.

The character size 102 is information that determines the size of the characters used to display the character strings that represent the menu items. As one example, this character size 102 may be a value showing the point size of character fonts.

The display area range 103 shows the range of a rectangular area on the GUI screen into which the list box 220 is arranged. The rectangular area is defined by the coordinates of the upper left vertex (X1,Y1) and the coordinates of the lower right vertex (X2,Y2). These coordinates are expressed in a two-dimensional coordinate system that is used for displaying the GUI screen. The values of these coordinates are determined in advance.

The single menu item information 110, 120, 130 . . . are separate items of information for each menu item, and each include a character string 111, 121, 131 . . . for displaying the menu item, a display rectangle width 112, 122, 132 . . . showing the width of the rectangular box used for displaying each menu item, and a display position 113, 123, 133 . . . showing the position at which the rectangular box for the menu item should be displayed.

The replaceable character string information storage unit 1140 is realized by an area in a memory and is used to store the replaceable character string information 30.

Figure 6:
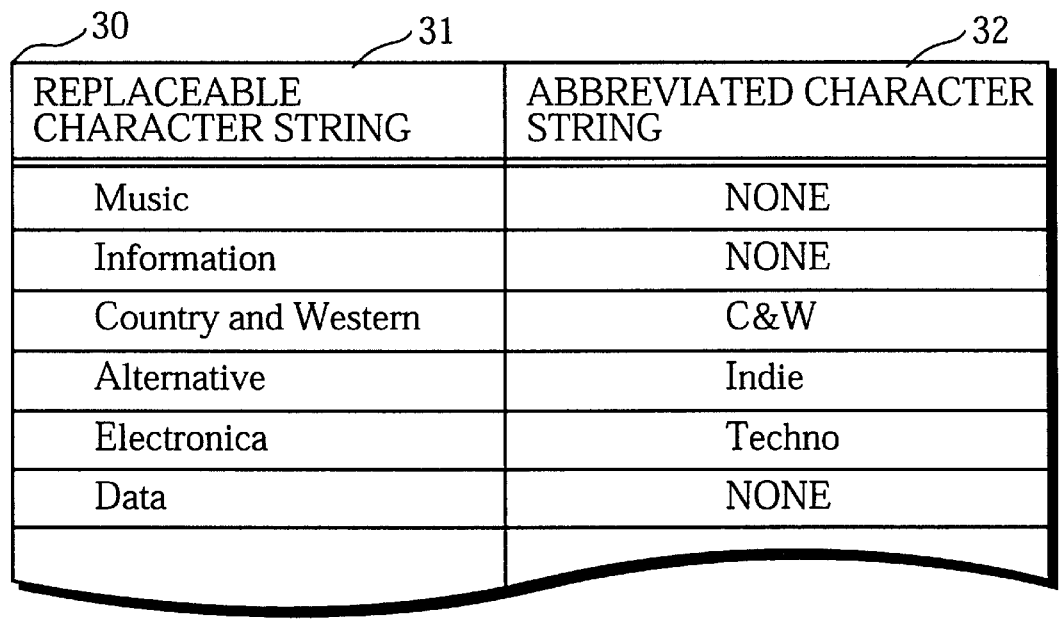
FIG. 6 shows the stored content of the replaceable character string information storage unit 1140.

FIG. 6 shows the data composition and an example content of the replaceable character string information 30 stored in the replaceable character string information storage unit 1140.

As shown in FIG. 6, the replaceable character string information 30 is composed of replaceable character strings 31 and abbreviated character strings 32. The column headed replaceable character strings 31 shows character strings which, when used as part or all of the character string of a menu item, can be replaced. The column headed replacement character strings 32 meanwhile shows the abbreviated forms of the replaceable character strings 31, which is to say, the character strings used in place of the replaceable character strings 31.

As shown in FIG. 6, the replaceable character strings 31 include "Music", "Information", "Country and Western", and "Alternative".

In FIG. 6, the abbreviated character strings 32 for the replaceable character strings 31 "Music" and "Information" are empty strings. This means that abbreviation of the character string "Music" amounts to the deletion of the character string, so that if a menu item is represented by a character string such as "World Music", the replaceable character string 31 "Music" can be deleted so that the menu item is displayed with the character string "World".

In the same way, the replaceable character string "Country and Western" will be replaced by the abbreviated character string "C&W", while the replaceable character string "Alternative" will be replaced by the analogous abbreviated character string "Indie".

The menu display attribute storage unit 1160 is also an area in a memory and is used to store menu display attribute information that determines the display attributes, such as the display colors and font type, to be used when displaying the menu items in the list box 220.

Operation

The following describes the operation of the layout unit 1130 in the GUI apparatus 1000 described above.

Figure 7:
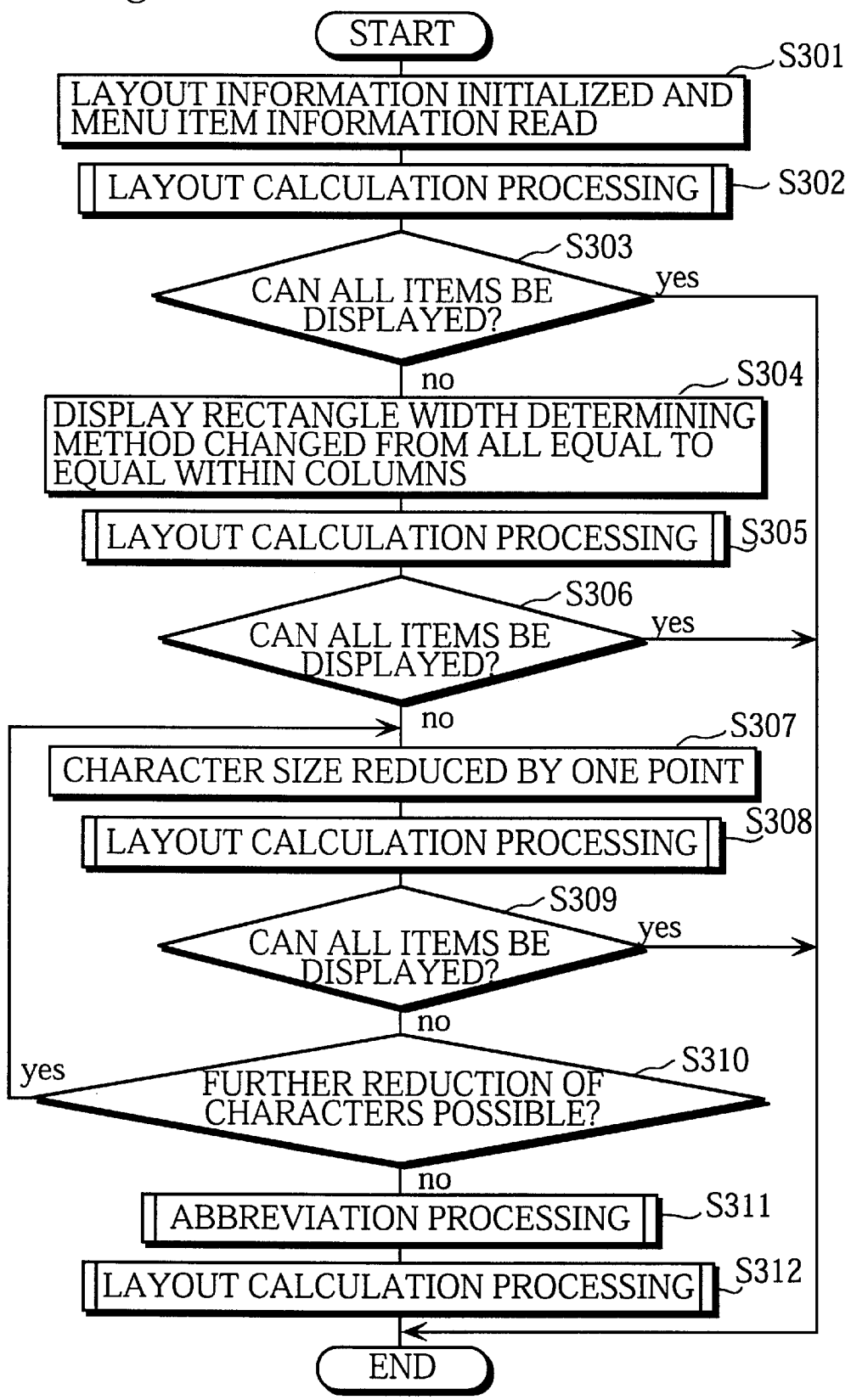
FIG. 7 is a flowchart showing the operation of the layout unit 1130.

FIG. 7 is a flowchart showing the operation of the layout unit 1130.

The layout unit 1130 operates according to control by the GUI control unit 1100. When activated by the GUI control unit 1100, the layout unit 1130 operates as shown in FIG. 7 to determine the layout of the menu items in the list box 220 that is arranged into one part of the GUI screen.

On being activated, the layout unit 1130 initializes the layout information 100 in the layout information storage unit 1150 and reads the menu item information stored in the menu item information storage unit 1120 (step S301). Here, the layout unit 1130 initializes of the layout information 100 by setting the display rectangle width determination method type 101 as "all equal", by setting the character size 102 as 24-point, and by clearing the content of the single menu item information 110, 120, 130 . . . .

The layout unit 1130 reads the menu item information by transferring the character strings expressing the menu items that are stored in the menu item information storage unit 1120 to the character strings 111, 121, 131 . . . in the single menu item information 110, 120, 130 . . . in the layout information storage unit 1150. Note that the menu item information obtaining unit 1030 will have stored subcategories that correspond to the category selected by the user into the menu item information storage unit 1120 on receiving an indication from the operation control function unit of the list box 210.

After reading all the menu item information, the layout unit 1130 performs the layout calculation processing (step S302). This layout calculation processing involves the calculation of the display position of each menu item and the storage of the calculated values in the display positions 113, 123, 133 . . . in the layout information 100 in the layout information storage unit 1150. A description of the layout calculation processing is given later in this specification.

After completing the layout calculation processing, the layout unit 1130 refers to the results of the layout calculation processing and judges whether all of the menu items can be displayed within the display area range of the list box 220 (step S303). If so, the layout unit 1130 terminates its operation.

If all of the menu items cannot be displayed within the display area range of the list box 220, the layout unit 1130 has the margin reducing unit 1132 change the display rectangle width determination method type 101 in the layout information 100 in the layout information storage unit 1150 from "all equal" to "equal within columns" (step S304), and performs the layout calculation processing once again (step S305).

After completing the layout calculation processing of step S305, the layout unit 1130 refers to the results of the layout calculation processing and judges whether all of the menu items can be displayed within the display area range of the list box 220 (step S306). If so, the layout unit 1130 terminates its operation. If all of the menu items cannot be displayed within the display area range of the list box 220, the layout unit 1130 instructs the character size reducing unit 1131 to reduce the value of the character size 102 in the layout information 100 in the layout information storage unit 1150 by one point (step S307), and performs the layout calculation processing once again (step S308).

After completing the layout calculation processing of step S308, the layout unit 1130 refers to the results of the layout calculation processing and judges whether all of the menu items can be displayed within the display area range of the list box 220 (step S309). If so, the layout unit 1130 terminates its operation. If all of the menu items cannot be displayed within the display area range of the list box 220 and the character size 102 is still above a predetermined threshold (S310:Yes), the layout unit 1130 returns to step S307 to have the character size reducing unit 1131 further reduce the value of the character size 102 by one point. If the character size 102 is not above the predetermined threshold (step 310:No), the layout unit 1130 has the abbreviating unit 1133 perform the abbreviation processing described later (step S311), and then performs the layout calculation processing (step S312).

The predetermined threshold is a value that is set in advance, and fundamentally is a value, such as 8-point, that represents the smallest size at which the characters on the screen will still be readable. In this way, the display size of the characters in the character strings can be reduced to enable more menu items to be displayed on the screen with the condition that the characters are still large enough to be read by the user.

Note that the value of this smallest size will depend on the eyesight of the user, and may be set at a higher value, such as 20-point, to ensure that the character strings are easy to read.

The following is a detailed description of the layout calculation processing performed by the layout unit 1130.

Figure 8:
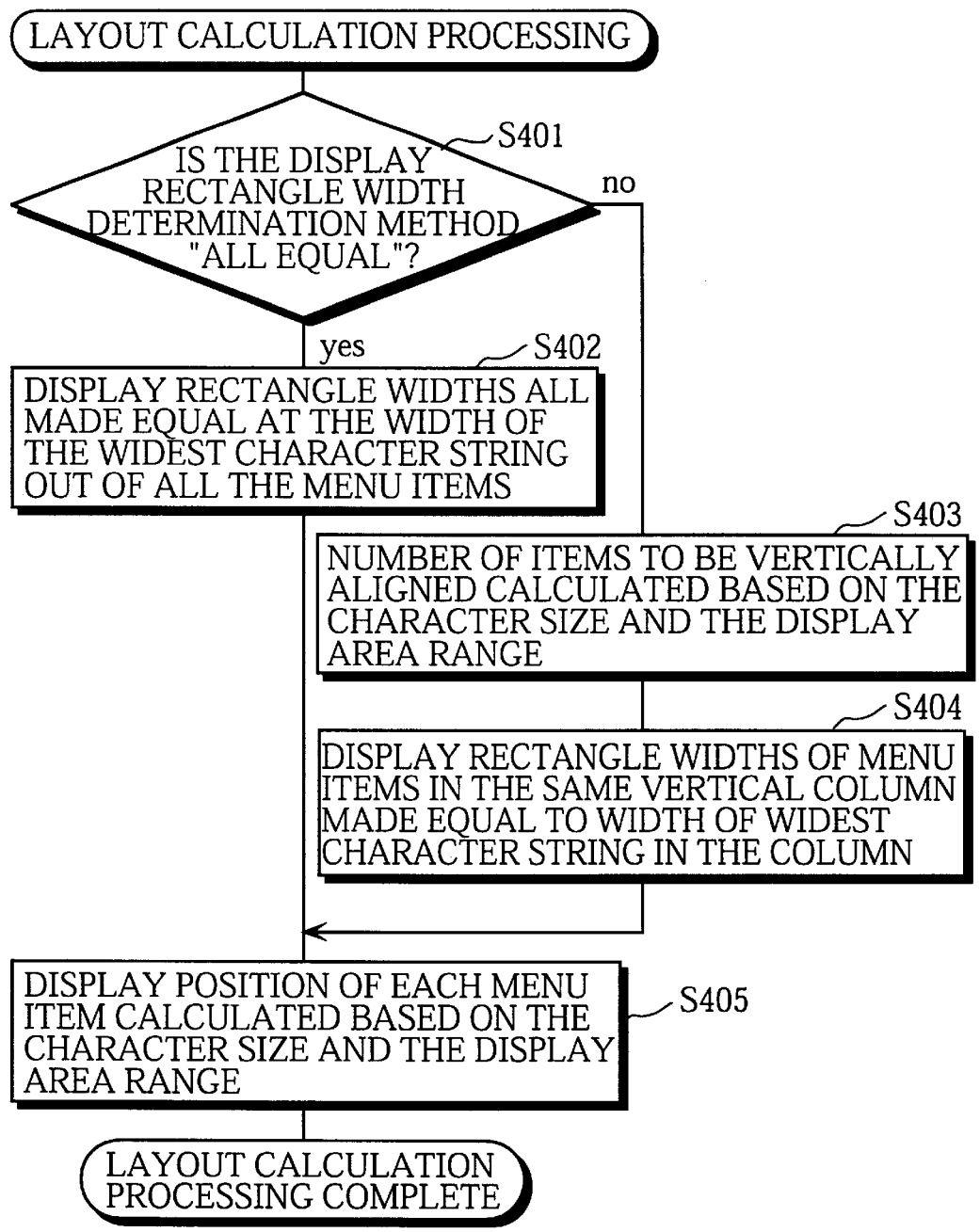
FIG. 8 is a flowchart showing the layout calculation processing performed by the layout unit 1130.

FIG. 8 is a flowchart showing the layout calculation processing performed by the layout unit 1130.

First, the layout unit 1130 refers to the display rectangle width determination method type 101 in the layout information 100 stored in the layout information storage unit 1150 and judges whether the display rectangle width determination method is "all equal" or "equal within columns" (step S401). When the display rectangle width determination method is "all equal", the layout unit 1130 finds the menu item that will be displayed with the widest display rectangle by referring to the character strings 111, 121 . . . in the sets of single menu item information in the layout information 100, the character size 102 in the layout information 100, and the font type stored in the menu display attribute storage unit 1160. The layout unit 1130 then sets the display rectangle width 112, 122 . . . in each set of single menu item information at the display rectangle width of this widest menu item (step S402).

When the display rectangle width determination method is "equal within columns", the layout unit 1130 uses the character size 102 and the display area range 103 to calculate the number of character strings (i.e., menu items) that can be arranged into the display area in the vertical direction (step S403). To arrange the menu items into vertical columns, the layout unit 1130 refers to the sets of single menu item information of menu items in the same column, specifies the menu item with the widest display rectangle, and sets the display rectangle width of this menu item into the display rectangle width 112, 122 . . . in the single menu item information of every menu item in the same column (step S404). The calculation of the widths of display rectangles in step S404 is performed by referring to the same information as in step S402.

The layout unit 1130 arranges a plurality of menu items into the first column on the left in the display area range of the list box 220 from top to bottom, and then arranges the next menu items into the second column again from top to bottom. The number of columns used to arrange the menu items depends on the total number of menu items and their respective contents.

When the layout unit 1130 has completed step S402 or step S404, values will have been set in the display rectangle widths 112, 122, 132 . . . in every set of single menu item information in the layout information 100 stored in the layout information storage unit 1150. The layout unit 1130 then calculates the display position of each menu item based on the display rectangle widths and character size 102, sets the calculation results in the appropriate display position 113, 123, 133, and completes the layout calculation processing (step S405).

The following describes the abbreviation processing performed by the abbreviating unit 1133.

Figure 9:
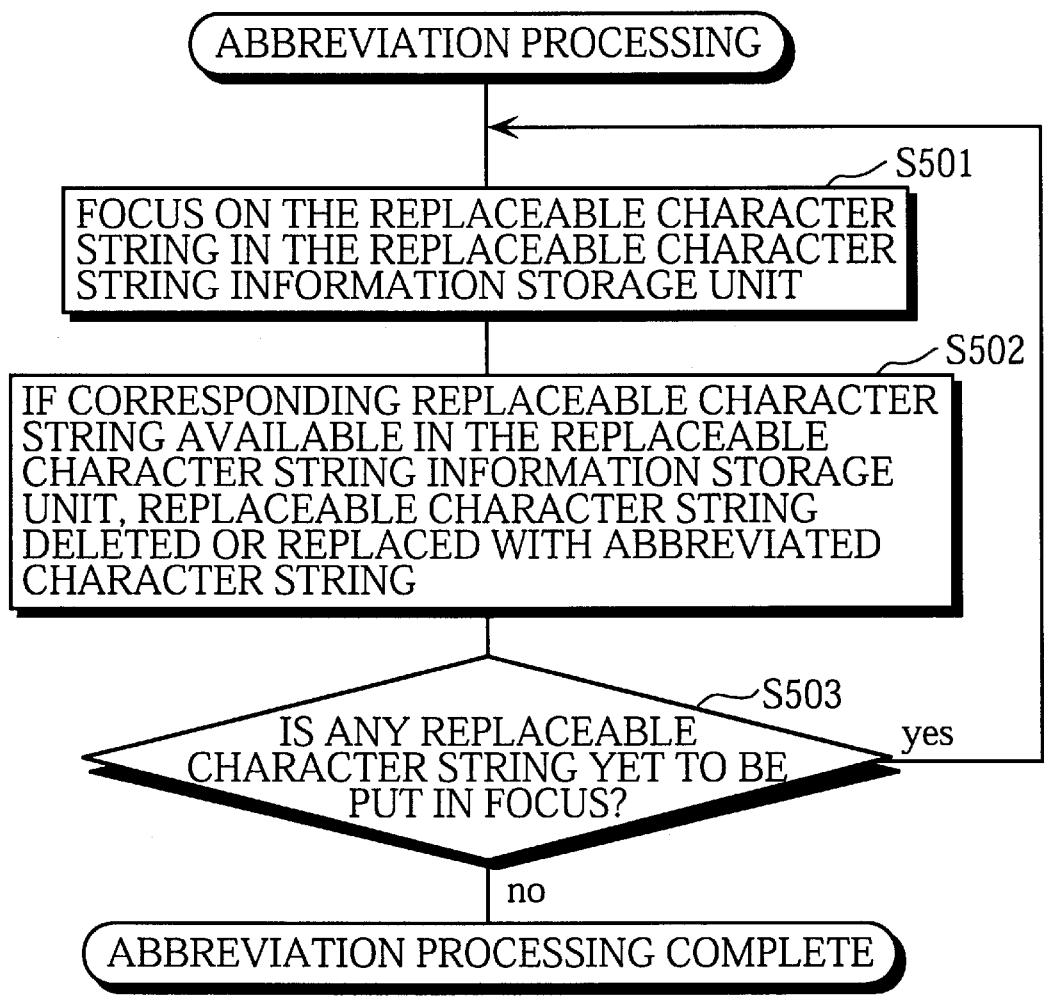
FIG. 9 is a flowchart showing the abbreviation processing performed by the abbreviating unit 1133.

FIG. 9 is a flowchart showing the abbreviation processing performed by the abbreviating unit 1133.

The abbreviating unit 1133 refers to the replaceable character string information 30 stored in the replaceable character string information storage unit 1140 and focuses on one replaceable character string (step S501). The abbreviating unit 1133 judges whether any of character strings in the sets of single menu item information in the layout information storage unit 1150 include the replaceable character string in focus. If so, the abbreviating unit 1133 replaces the replaceable character string in such character strings with the corresponding abbreviated character string (step S502). Note that when no abbreviated character string is given in the replaceable character string information corresponding to a replaceable character string, the replaceable character string is simply deleted from the character strings for the menu items.

Next, the abbreviating unit 1133 judges whether that are any replaceable character strings in the replaceable character string information 30 that have not been brought into focus (step S503). If so, the abbreviating unit 1133 selects a new replaceable character string and the processing returns to step S501. If no such replaceable character string exists, the abbreviating unit 1133 terminates the abbreviation processing.

The following describes the operation of the GUI apparatus 1000 using specific examples.

This explanation assumes that the GUI screen shown in FIG. 2 is displayed on the monitor and that the user has operated the remote controller to select "Music" as his/her desired category. This selection can be made, for example, by the user positioning the focus on the displayed category "Music" using the "Down" button on the remote controller and then pressing the "Enter" button to confirm the selection.

In response to this selection, the operation control function unit for the list box 210 instructs the menu item information obtaining unit 1030 to obtain the subcategories for the category "Music" and has these subcategories stored in the menu item information storage unit 1120. The operation control function unit also asks, via the GUI control unit 1100, the menu control unit 1110 to change the display content of the list box 220.

As a result, the menu control unit 1110 activates the layout unit 1130 to change the layout of the menu items for the list box 220. At this point, it is assumed that the menu item information shown in FIG. 4 is stored in the menu item information storage unit 1120, so that a total of ten menu items should be displayed. Predetermined values are stored in the display area range 103 in the layout information 100 of the layout information storage unit 1150, so that the display area of the list box 220 is set as 60 mm high and 150 mm wide.

Once activated, the layout unit 1130 sets the display rectangle width determination method type 101 in the layout information 100 stored in the layout information storage unit 1150 as "all equal" and the character size 102 at "24-point". After this, the layout unit 1130 reads the ten menu items (see FIG. 4) stored in the menu item information storage unit 1120 and sets the character strings of the menu items in the character strings 111, 121 . . . in the sets of single menu item information 110, 120 . . . in the layout information 100 (step S301). When doing so, the layout unit 1130 produces as many sets of single menu item information (i.e., ten) as there are menu items.

After reading all of the menu item information, the layout unit 1130 performs the layout calculation processing (step S302). If all of the menu items can be arranged into the display area of the list box 220 (step S303:Yes), the layout processing is terminated. In the present example, it is assumed that all menu items can be displayed on the screen. Note that in this example, the sizes of the menu items allow the text to be displayed using 24-point text and that the size of the display rectangles of the menu items is set as 12 mm high by 75 mm wide so as to accommodate even the widest character string of the menu items (see FIGS. 4,8). If it is assumed that the character strings are displayed using vector fonts, the widths of the character strings can be obtained by calling a character string drawing function that is usually provided by an operating system or the like, with the font type and the character strings as arguments.

FIG. 10 shows the content of the layout information 100 that relates to the layout of the above ten menu items. Note that while the display area range, the display rectangle widths, and the display positions are actually coordinates in a two-dimensional coordinate system that is used for the GUI screens, these values are expressed here in millimeters for ease of understanding.

After activating the layout unit 1130, the menu control unit 1110 refers to the layout information storage unit 1150 and the menu display attribute storage unit 1160 and displays the menu items with the predetermined attributes (such as display colors) in accordance with the determined layout. The menu control unit 1110 performs this process via the GUI control unit 1100 and the display unit 1020. The processing required to draw the character strings and display rectangles can be performed by calling a character string drawing function and a graphics drawing function that are generally provided by the OS or the like.

Figure 11:
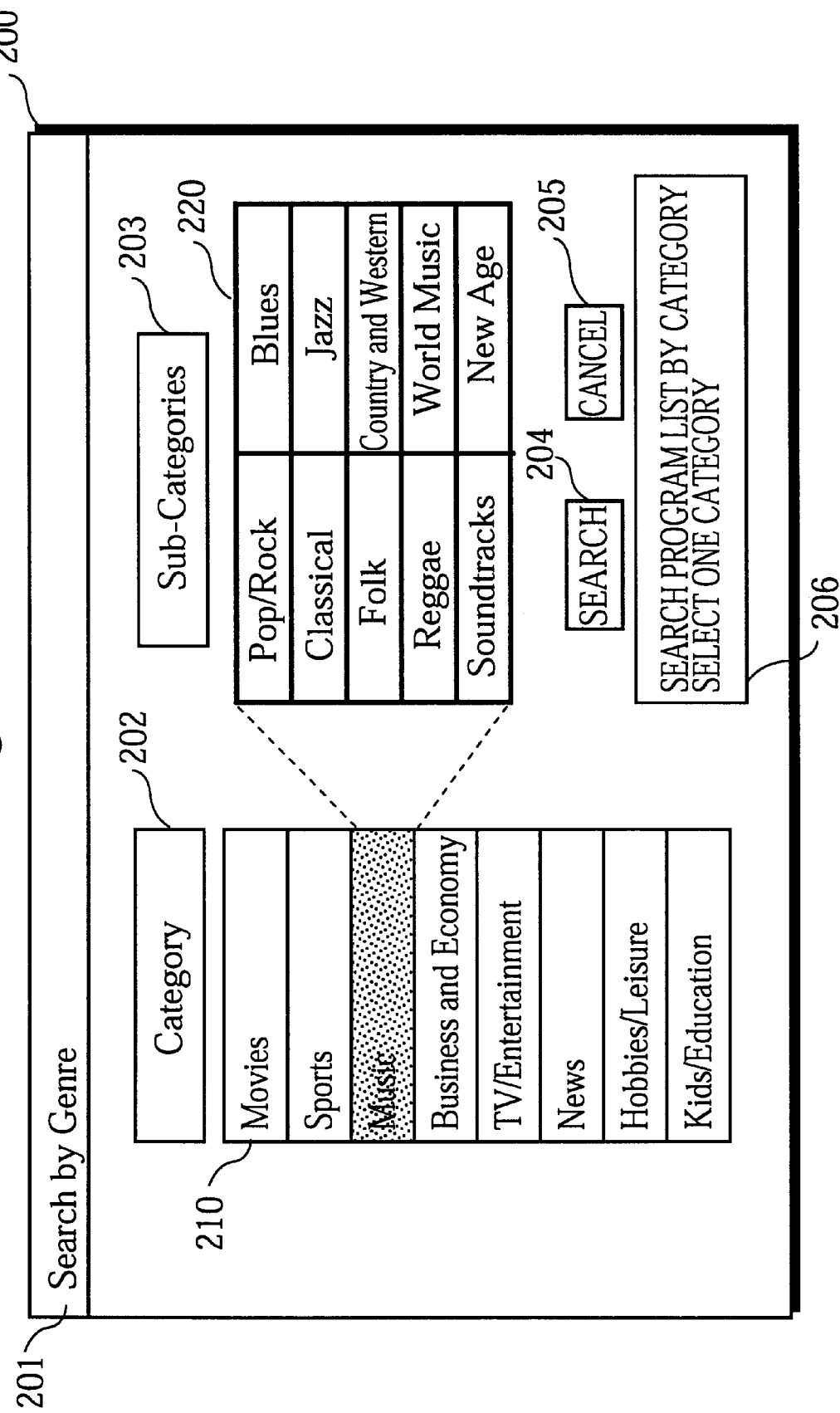
FIG. 11 shows a GUI screen including a list box 220 that displays ten menu items.

The above processing results in the monitor displaying the GUI screen shown in FIG. 11.

FIG. 11 shows a GUI screen including a list box 220 that displays ten menu items.

The following describes the case when the layout unit 1130 is activated with the stored content of the menu item information storage unit 1120 being a total of twelve menu items composed of the ten menu items in the previous example (see FIG. 4) and the two new menu items "Alternative" and "Concert Information". Note that since the menu item information is broadcast to the digital broadcast reception apparatus, its content may change over time.

In this new example, the layout unit 1130 reads the menu item information and performs the position calculation processing as before (steps S301, 302). However, since twelve menu items that are 12 mm high and 75 mm wide will not fit into the display area of the list box 220 that is 60 mm high by 150 mm wide, the processing takes the "No" branch of the judgement block for step S303 so that the margin reducing unit 1132 changes the display rectangle width determination method type 101 in the layout information 100 stored in the layout information storage unit 1150 from "all equal" to "equal within columns" (step S304).

After this, the layout unit 1130 repeats the layout calculation processing once again (step S305). Through the processing in steps S403 and S404, and not step S402, the layout unit 1130 finds that the menu items such as "Pop/Rock" and "Classical" in the first column do not require as wide a display rectangle as the menu items, like "Country and Western", in the second column (see FIG. 11). However, the use of narrower display rectangles for the first column still does not create enough room for a third column including the menu items "Alternative" and "Concert Information". In other words, all of the menu items cannot be displayed within the display area of the list box 220.

The above circumstances result in the "No" branch being taken in the judgement block of step S306, so that the character size reducing unit 1131 updates the character size 102 in the layout information 100 stored in the layout information storage unit 1150 by reducing its value by one point from 24-point to 23-point (step S307). The layout unit 1130 then repeats the layout calculation processing (step S308). So long as it is still not possible to display all of the menu items (step S309:No), the character size 102 is repeatedly reduced by one point at a time and the layout calculation processing is repeated (steps S310:Yes, S307, S308) until the predetermined threshold (such as 8-point) for the character size is reached. In the present example, assume that it is possible to display all of the menu items when the character size reaches 20-point.

The content of the layout information 100 for the present example is as shown in FIG. 12. FIG. 12 shows an example content of the layout information 100 when twelve menu items are arranged.

In comparison with the layout information 100 in FIG. 10, the layout information 100 in FIG. 12 uses 20-point instead of 24-point as the character size 102, so that six menu items can be displayed in each column. The display rectangle width determination method type 101 in FIG. 12 is "equal within columns" instead of "all equal", so that the margins of the menu items in the same column as "Pop/Rock" are reduced, changing the display rectangle width from 75 to 50.

The menu control unit 1110 displays the menu items in accordance with the layout information 100 shown in FIG. 12, using the GUI control unit 1100 and the display unit 1020. As a result, the GUI screen shown in FIG. 13 is displayed on the monitor.

Figure 13:
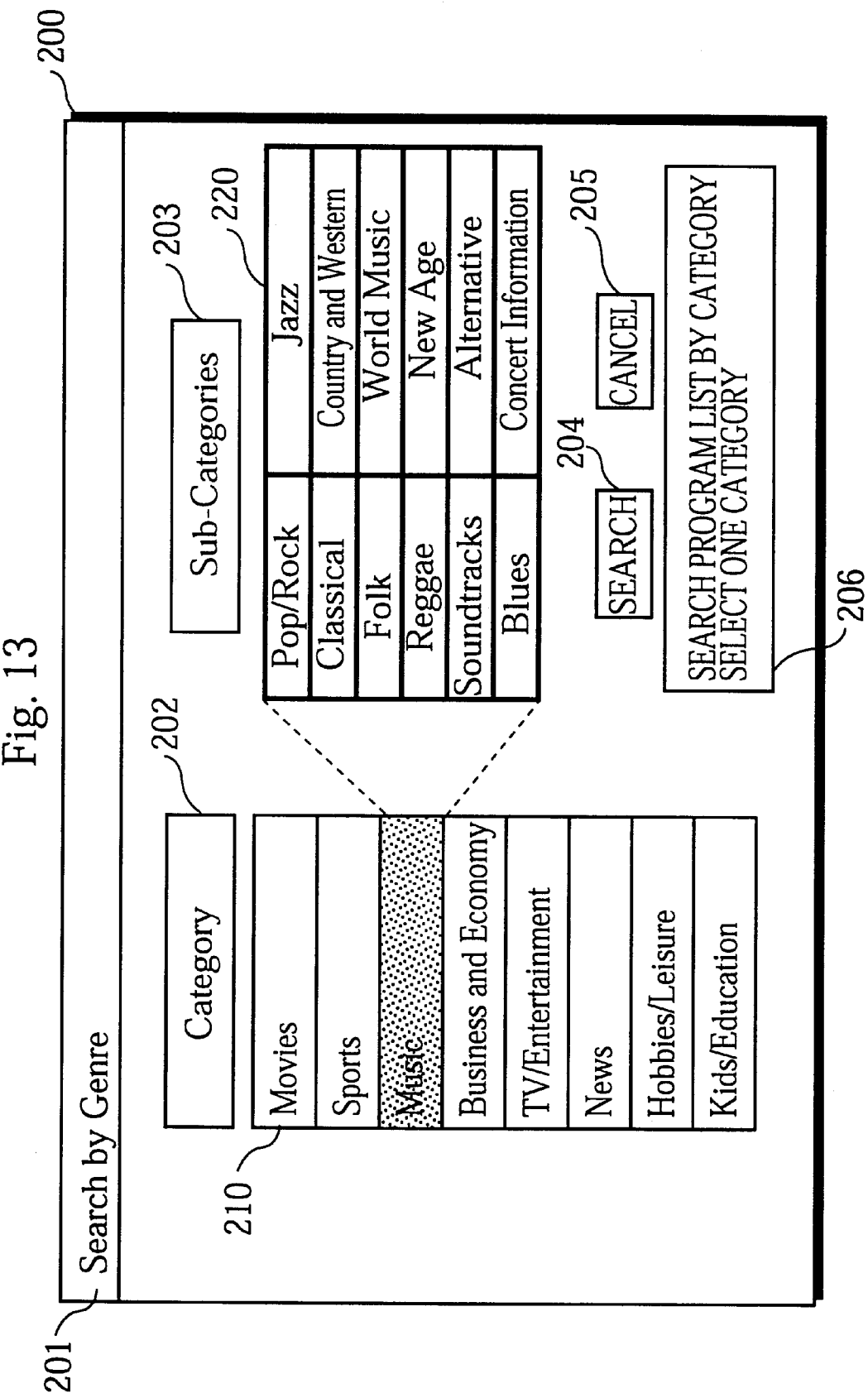
FIG. 13 shows a GUI screen including a list box 220 that displays twelve menu items.

FIG. 13 shows a GUI screen including a list box 220 that displays twelve menu items.

The following describes the case when more menu items, such as "Dance" and "Recommended" are added to the menu items shown in FIG. 13. In this example, priority is given to displaying menu items with text that is easy to read, so that the predetermined threshold for the judgement in step S310 is set at 20-point to ensure that the character size is not reduced to below 20-point.

Since a greater number of menu items need to be displayed without reducing the character size of the menu items from the size shown in FIG. 13, the layout calculation processing is performed with the character size set at 20-point (step S308). In this case, the layout unit 1130 judges that it is not possible to display all of the menu items (step S309), and since the character size has reached its lower limit of 20-point, the processing takes the "No" branch of the judgement block for step S310. This results in the abbreviating unit 1133 performing the abbreviation processing (step S311).

In detail, the abbreviating unit 1133 focuses on the replaceable character strings, such as "Music", "Information", "Country and Western", or "Alternative", in the replaceable character string information storage unit 1140 (see FIG. 6) one at a time. On finding a character string 111, 121 . . . in a set of single menu item information in the layout information 100 stored in the layout information storage unit 1150 that includes the replaceable character string in focus, the abbreviating unit 1133 replaces the replaceable character string in such character string with the abbreviated character string corresponding to the replaceable character string (see FIG. 9).

As examples, this results in the menu item "World Music" being abbreviated to "World" and the menu item "Country and Western" being abbreviated to "C&W". Note that the abbreviated character strings stored in advance in the replaceable character string information storage unit 1140 are specially chosen so that there is still a high probability of the user being able to understand the meaning of a menu item that has the abbreviated form.

Once the character strings have been abbreviated, the layout unit 1130 performs the layout calculation processing once again (step S312).

In this case, the layout information 100 is as shown in FIG. 14.

FIG. 14 shows the content of the layout information 100 when thirteen or more menu items are to be arranged into the list box 220.

In comparison with the layout information 100 in FIG. 12, the layout information 100 in FIG. 14 includes the abbreviated character string "C&W" in the second column, which reduces the width of the display rectangles of menu items in the second column from 75 to 40. This creates enough room for a third column in which "Recommended" and the other character strings can be displayed.

In accordance with the determined layout, the menu control unit 1110 displays the menu items using the GUI control unit 1100 and the display unit 1020. As a result, the GUI screen shown in FIG. 15 is displayed on the monitor.

Figure 15:
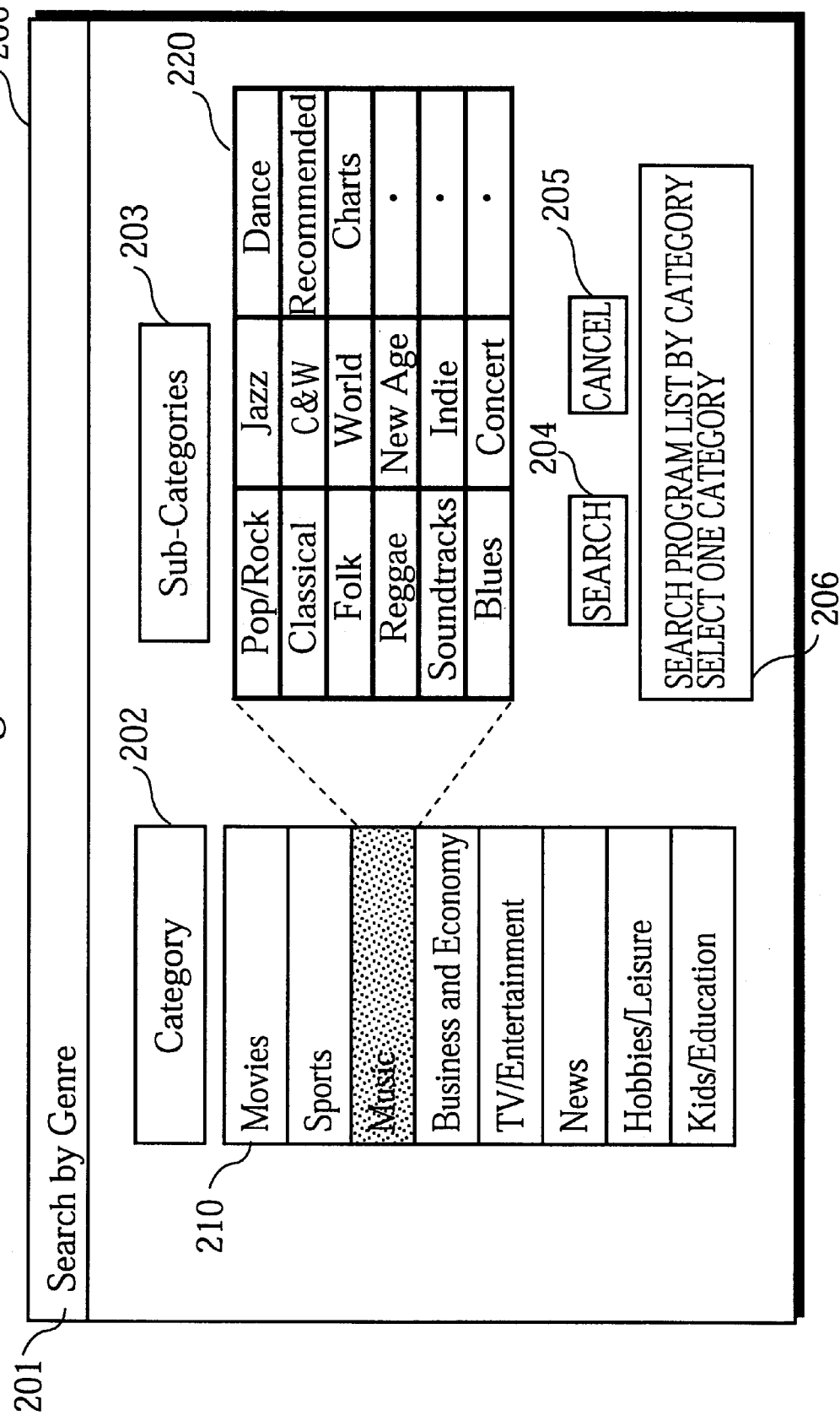
FIG. 15 shows a GUI screen including a list box where a number of menu items have been added to the menu items shown in FIG. 13.

FIG. 15 shows a GUI screen including a list box where a number of menu items have been added to the menu items shown in FIG. 13. By abbreviating menu items like "Country and Western" and "Concert Information" that were given in FIG. 13, the widths of the display rectangles in the first two columns from the left of the list box 220 are reduced, which generates enough room in the list box 220 to add a third column including the menu items "Dance", "Recommended", and "Charts".

The GUI apparatus of the present invention has been described by way of the above embodiment, thought it should be obvious that the present invention is not limited to the above. Example modifications are given below.

(1) In the above embodiment, all menu items were displayed in the same GUI element, the list box 220. This is not a limitation for the present invention, and each menu item may be displayed by an independent GUI element, such as its own command button. In such case, the display area into which the GUI elements for all of the menu items are to be arranged will be determined in advance, and the GUI apparatus of the present invention will arrange the GUI elements into this display area. In other words, the GUI apparatus of the present invention can determine the layout of a number of GUI elements in addition to the internal layout of each GUI element. Note that the GUI apparatus of the present invention is also capable of dealing with GUI elements that cannot be selected by a user, which is to say, non-interactive GUI elements that are simply displayed on the screen.

(2) In the above embodiment, menu items were described as being represented by character strings, although each character string need only contain one or more characters and may include numbers or symbols. Also in the above embodiment, the menu item information stored in the menu item information storage unit 1120 was described as only corresponding to the items in the list box 220 that correspond to subcategories, although this is not a limitation for the invention and data corresponding to categories may also be included. In fact, there are no particular restrictions regarding the data structure of the menu item information, with it only needing to directly or indirectly show the menu items (i.e., character strings) that should be displayed in the list box 220. As one example, all of the subcategories that correspond to the various categories may be stored in the menu item information storage unit 1120. The layout unit 1130 may obtain a pointer to a group of subcategories that are to be displayed and display the subcategories corresponding to a presently selected category as a list of menu items.

(3) In the above embodiment, the menu item information obtaining unit 1030 is described as obtaining the menu item information from the reception subsystem of the digital broadcast reception apparatus and then storing the menu item information in the menu item information storage unit 1120. However, since the GUI apparatus of the present invention is characterized by referring to groups of menu items, determining the display format and display position of these menu items and favorably displaying the menu items in a predetermined part of the screen, the menu item information may be stored in the menu item information storage unit 1120 in advance.

(4) In the above embodiment, the display format of each menu item displayed as part of the GUI screen is described as being a character string written within a rectangular frame. However, this is not a limitation for the present invention, so that any combination of graphics, still images, moving images, and character strings may be used. When character strings are displayed within rectangular frames, any of left-align, right-align, or center-align can be used as the display position of the character strings. Character strings can be written horizontally or vertically, and may be displayed using more than one line.

Note that even when a menu item is displayed using only graphics, a still image, or a moving image in place of a character string, the display size of the menu item can still be reduced by trimming the graphics, a still image, or a moving image in the same way as reducing the point size of the displayed characters. This can be achieved with the present invention by making appropriate adjustments to the character size reducing unit 1131. Also, characters, graphics and the like for a reduced display of menu items can be stored in the replaceable character string information storage unit 1140 corresponding to the graphics, still images, and moving images used to display menu items, so that the abbreviating unit 1133 can replace the images with their corresponding reduced forms to generate more room in the display area.

(5) In the above embodiment, a plurality of menu items were described as being arranged into a grid pattern with one, two or three columns, with the margin reducing unit 1132 switching the display rectangle width determination method between "all equal" and "equal within columns" to reduce the widths of the display rectangles without overly affecting the appearance of the menu items. However, the present invention is not limited to this, so that the margins may be removed from all of the displayed menu items. When doing so, the differences in length between the character strings of menu items mean that the menu items cannot be displayed in a regularly arranged grid pattern.

In the above embodiment, the minimum width of the rectangles used to display the character strings was set equal to the widest rectangle in the same column, although this need not be the case. As one example, all menu items in the same column may be set at a set proportion, such as two-thirds, of the widest character string in the column. In such case, it will not be possible to display the character string of every menu item in its entirety, though the character strings may be left-aligned and the entire character string of each menu item may be displayed when the focus is moved to the menu item. The widths of the display rectangles used for character strings may also be set in proportion to the character size used for the character strings.

(6) In the above embodiment, the replaceable character strings stored in the replaceable character string information storage unit 1140 were described as being determined in advance according to the replaceable character string information, although this need not be the case. As one example, when "Music" is selected as the category, the expression "music" may be treated as deletable for the subcategories, while when "News" is selected as the category, the expression "music" does not need to be deletable. In this way, the character strings that may be deleted from the character strings used as subcategories may change according to the category selected by the user.

Also, by using underlines or the like to emphasize the display of the character strings from which characters have been deleted, the user can be made aware that deletion has taken place. As one example, after the expression "Music" is deleted from the character string "World Music", the remaining character string "World" may be underlined on the display.

(7) In the above embodiment, the character size reducing unit 1131 was described as decreasing the character size 102 by one point at a time (step S307), although this character size may be reduced by two points at a time, by a half-point at a time, or in any other way.

(8) The above embodiment states that the character strings are displayed using vector fonts, although this need not be the case. As one example, a bitmapped font with a fixed character width may be used. When doing so, the layout unit 1130 can easily calculate the width of a character string using this fixed width of the characters.

(9) The above embodiment describes examples where ten or more menu items are used, although when there are only a few menu items to be displayed, such menu items may be displayed according to a predetermined fixed layout. As one example, the positions for arranging the first to tenth menu items may be determined in advance, so that when three menu items need to be displayed, these menu items may be displayed in the first to third positions. Similarly, when seven menu items need to be displayed, these menu items may be displayed in the first to seventh positions.

(10) In the above embodiment, margin reduction, character size reduction, and abbreviation are performed in stages in that order to reduce the display size of menu items and so display a greater number of menu items in the display area of the list box 220 (see FIG. 7). However, the above processes do not need to be performed in the stated order.

The display size of menu items may alternatively be reduced by a method that only uses one or two of the above processes of margin reduction, character size reduction, and abbreviation. Note that when there are so many menu items that simultaneous display in the display area of the list box 220 is not possible, a greatest possible number of menu items may be initially displayed in the display area and a scroll bar or display switching button may be provided to have the remaining menu items displayed.

(11) In the above embodiment, the menu items are all expressed using the standard English alphabet, although double-byte characters such as those used in Japanese or Chinese may be used. Also, the replaceable character string information 30 shown in FIG. 6 was described as associating replaceable character strings with abbreviated character strings, although images or other marks may be used in place of the abbreviated character strings. Note that the replaceable character string information storage unit 1140 may only store the replaceable character strings without associating them with abbreviated character strings, with the abbreviating unit 1133 simply deleting every instance of a replaceable character string from menu items that include the character string.

(12) The above embodiment states that the GUI apparatus forms part of a digital broadcast reception apparatus, although the present invention does not need to be used in this way, and so can be used to control the user interface of a household appliance, such as a DVD recorder, or of one part of a standard personal computer.

(13) The processing (such as that shown by the flowcharts in FIGS. 7–9) of the GUI apparatus of the above embodiment may be realized by a machine language program that may be distributed and sold after being recorded onto a recording medium. This recording medium may be an IC (Integrated Circuit) card, an optical disc, a flexible disk, or a ROM (Read Only Memory). The machine language program recorded on this medium may be used having been installed into a standard personal computer or a domestic appliance that is capable of executing a program. This means that a standard personal computer or a domestic appliance can sequentially execute a machine language program to realize the GUI apparatus described in the above embodiment.

A computer program that has a standard personal computer or household appliance execute the processing of the above GUI apparatus may be also distributed having been recorded onto a recording medium such as a hard disk or by being transmitted via a communication path.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A GUI apparatus that displays a plurality of menu items composed of character strings in a predetermined area of a screen, the GUI apparatus comprising:

menu item storing means for storing a plurality of menu items;

replaceable character string information storage means for storing at least one replaceable character string associated with a mark that represents the replaceable character string and has a smaller display size than the replaceable character string;

display form determining means for determining, when it is not possible to arrange every menu item into the predetermined area with a predetermined character size as part of a display form for each menu item, a display form of each menu item by replacing at least one replaceable character string in a character string of at least one menu item with a mark associated with the replaceable character string in the replaceable character string information storage means;

display position determining means for determining, after the display forms of the menu items have been determined by the display form determining means, the display position of each menu item so that the menu items do not overlap one another; and display means for displaying the plurality of menu items in accordance with the display forms determined by the display form determining means and the display positions determined by the display position determining means.

2. A GUI apparatus according to claim 1, further comprising menu item obtaining means for obtaining the plurality of menu items from outside the GUI apparatus and storing the obtained plurality of menu items into the menu item storing means.

3. A GUI apparatus that displays a plurality of menu items composed of character strings in a predetermined area of a screen, the GUI apparatus comprising:

menu item storing means for storing a plurality of menu items;

deletable character string information storing means for storing deletable character strings;

display form determining means for determining, when it is not possible to arrange every menu item into the predetermined area with a predetermined character size as part of a display form for each menu item, a display form of each menu item by deleting at least one deletable character string given in the deletable character string information storing means from a character string of at least one menu item;

display position determining means for determining, after the display forms of the menu items have been determined by the display form determining means, the display position of each menu item so that the menu items do not overlap one another; and display means for displaying the plurality of menu items in accordance with the display forms determined by the display form determining means and the display positions determined by the display position determining means.

4. A computer-readable storage medium recording a control program for execution by a computer equipped with a memory storing a plurality of menu items composed of character strings and replaceable character string information where at least one replaceable character string is associated with a mark that represents the replaceable character string and has a smaller display size than the replaceable character string, the control program having the computer perform a GUI control process that displays the plurality of menu items in a predetermined area of a screen, the GUI control process comprising:
   a display form determining step for determining, when it is not possible to arrange every menu item in the memory into the predetermined area with a predetermined character size as part of a display form for each menu item, a display form of each menu item by replacing at least one replaceable character string in a character string of at least one menu item with a mark associated with the replaceable character string in the replaceable character string information;
   a display position determining step for determining, after the display forms of the menu items have been determined by the display form determining step, the display position of each menu item so that the menu items do not overlap one another; and
   a display step for displaying the plurality of menu items in accordance with the display forms determined by the display form determining step and the display positions determined by the display position determining step.

5. A computer-readable storage medium recording a control program for execution by a computer equipped with a memory storing a plurality of menu items composed of character strings and deletable character string information showing at least one deletable character string, the control program having the computer perform a GUI control process that displays the plurality of menu items in a predetermined area of a screen, the GUI control process comprising:
   a display form determining step for determining, when it is not possible to arrange every menu item in the memory into the predetermined area with a predetermined character size as part of a display form for each menu item, a display form of each menu item by deleting at least one deletable character string given in the deletable character string information from a character string of at least one menu item;
   a display position determining step for determining, after the display forms of the menu items have been determined by the display form determining means, the display position of each menu item so that the menu items do not overlap one another; and
   a display means for displaying the plurality of menu items in accordance with the display forms determined by the display form determining step and the display positions determined by the display position determining step.

6. A GUI apparatus that displays a plurality of menu items composed of character strings in a predetermined area of the screen, the GUI apparatus comprising:

menu item storing means for storing a plurality of menu items;
display form determining means for determining when it is not possible to arrange every menu item into the predetermined area with a predetermined character size as part of a display form of each menu item, a display form of each menu item by reducing a character size used in the display form of at least one menu item;
display position determining means for determining, after the display forms of the menu items have been determined by the display form determining means, a display position of each menu item so that the menu items do not overlap one another; and
display means for displaying the plurality of menu items in accordance with the display forms determined by the display form determining means and the display positions determined by the display position determining means, wherein the display form determining means reduces the character size with a predetermined size as a minimum value, and when it is still not possible to arrange every menu item into the predetermined area after reducing the character size, determines the display form of each menu item by reducing a number of characters in a character string of at least one menu item.

7. A GUI apparatus according to claim 6, further comprising menu item obtaining means for obtaining the plurality of menu items from outside the GUI apparatus and storing the obtained plurality of menu items into the menu item storing means.

8. A computer-readable storage medium recording a control program for execution by a computer equipped with a memory storing a plurality of menu items composed of character strings, the control program having the computer perform a GUI control process that displays the plurality of menu items in a predetermined area of a screen, the GUI control process comprising:

display form determining step for determining, when it is not possible to arrange every menu item into the predetermined area with a predetermined character size as part of a display form of each menu item, a display form of each menu item by reducing a character size used in the display form of at least one menu item;
display position determining step for determining, after the display forms of the menu items have been determined by the display form determining steps, a display position of each menu item so that the menu items do not overlap one another; and
display step for displaying the plurality of menu items in accordance with the display forms determined by the display form determining steps and the display positions determined by the display position determining steps, wherein the display form determining step reduces the character size with a predetermined size as a minimum value, and when it is still not possible to arrange every menu item into the predetermined area after reducing the character size, determines the display form of each menu item by reducing a number of characters in a character string of at least one menu item.

* * * * *